United States Patent
Lampard

(10) Patent No.: US 7,367,307 B2
(45) Date of Patent: May 6, 2008

(54) SPLIT PHASE FUEL CONDITIONER

(75) Inventor: Robert Douglas Lampard, Canningvale (AU)

(73) Assignee: Barrack Combustion Process Pty Ltd., Fremantle WA (AU)

( * ) Notice: Subject to any disclaimer, the term of this patent is extended or adjusted under 35 U.S.C. 154(b) by 453 days.

(21) Appl. No.: 10/515,624

(22) PCT Filed: Nov. 25, 2002

(86) PCT No.: PCT/AU02/01586

§ 371 (c)(1),
(2), (4) Date: May 16, 2005

(87) PCT Pub. No.: WO03/104626

PCT Pub. Date: Dec. 18, 2003

(65) Prior Publication Data

US 2005/0247283 A1    Nov. 10, 2005

(30) Foreign Application Priority Data

Jun. 7, 2002    (AU) .................................. PS 2804

(51) Int. Cl.
*F02B 19/02* (2006.01)
(52) U.S. Cl. ...................... 123/288; 123/292
(58) Field of Classification Search ............... 123/288, 123/255, 261, 269, 275, 292, 299
See application file for complete search history.

(56) References Cited

U.S. PATENT DOCUMENTS

| | | |
|---|---|---|
| 1,653,825 A | 12/1927 | Leon |
| 4,532,899 A | 8/1985 | Lorts |
| 4,641,616 A | 2/1987 | Lampard |

FOREIGN PATENT DOCUMENTS

| | | |
|---|---|---|
| EP | 0595473 | 5/1994 |
| EP | 0632191 | 1/1995 |
| EP | 0971107 | 1/2000 |
| GB | 2031513 | 4/1980 |

OTHER PUBLICATIONS

Supplementary European Search Report EP 02779008.
International Search Report PCT/AU02/01586.

*Primary Examiner*—Willis R. Wolfe
*Assistant Examiner*—Johnny H. Hoang
(74) *Attorney, Agent, or Firm*—Neifeld IP Law, PC

(57) ABSTRACT

A split phase fuel conditioner 10 includes a main body 20 defining an ignition chamber 22. A transfer passage 24 is in fluid communication between the ignition chamber 22 and chamber 14. A valve 28 selectively opens and closes a throat 26 of the transfer passage 24 to control fluid communication between chamber 22 and chamber 14. A first injector 30 injects a first fuel volume into ignition chamber 22. A second fuel injector 32 injects a second volume of fuel directly into transfer passage 24 through the first valve 28. The first fuel volume is ignited in the chamber 22 to form an ignition plasma. Valve 28 is opened allowing the ignition plasma to condition the second fuel volume by vaporising the second fuel volume. The ignition plasma then sweeps the conditioned second fuel volume into the combustion chamber where it combusts in a controlled manner.

23 Claims, 3 Drawing Sheets

SPLIT PHASE FUEL CONDITIONER

This application is a PCT national stage entry of PCT/AU02/01586 filed Nov. 25, 2002, which claims Paris priority to Australian application PS2804, filed Jun. 7, 2002.

FIELD OF THE INVENTION

The present invention relates to a split phase fuel conditioner particularly, though not exclusively, for diesel engines, and engines operating on low grade and/or low octane rated fuels.

BACKGROUND OF THE INVENTION

An inherent characteristic of large bore direct injection diesel engines is the very short time available for the satisfactory introduction of fuel into the combustion chamber. This often leads to the phenomenon of ignition delay which causes physical damage to the diesel engine as it forces peak cylinder pressure far higher than ordinarily desired. Since the inception of diesel engines, substantial efforts have been placed in reducing the detrimental effects of ignition delay.

Fuel technologists have attempted in part to decrease the phenomenon of ignition delay by raising the cetane value of diesel fuels. Various engineering techniques have also been employed to reduce this phenomenon. While some progress has been made, ignition delay still persists.

Ignition delay is a chemical phenomenon caused by the fact that before any liquid hydrocarbon fuel can spontaneously ignite from compression heat, it must first vaporise and gather sufficient heat from the air to raise it well above its self-ignition temperature.

While in theory this may seem straight forward, it is compromised by the very short time available during the conventional diesel cycle within which to vaporise the fuel. Typically, the fuel injection period for a diesel engine is about 15 crank degrees before top dead center (TDC). Thus even for a low speed diesel engine operating at, say 1500 rpm, this time period is less than two thousandths of a second.

The situation is further aggravated by the fact that the liquid fuel when it evaporates can absorb a disproportionate amount of compression heat, and due to its much higher mass than the air, there is a reduction in the rate of heat transfer from the air to the fuel.

As a consequence, instead of the injected fuel burning as soon as it is introduced into a main combustion chamber of the diesel engine, and thus liberate the heat value of the fuel at a controlled combustion rate, the ignition delay allows the fuel to accumulate such that upon finally reaching self-ignition temperature, all the accumulated fuel present along with that being injected tends to explode in an uncontrolled manner rather than steadily burn. Consequently, very high peak cylinder pressure is created just prior to TDC which also coincides with compression pressure reaching its maximum. When close to TDC, due to the alignment of crank bearings, fast and sympathetic expansion of the combustion chamber is not possible. Thus, in maintaining pressure and temperature equilibrium, a substantial proportion of the heat generated by the fuel is simply transferred to other engine components rather than being directed to useful work.

Further, the high peak pressure at TDC heavily loads the piston rings of the engine against its cylinder walls at a time when they are momentarily stationary (that is, changing from the upward compression stroke to the downward expansion stroke) and therefore unable to generate a hydrodynamic lubrication film. This leads to unprotected metal-to-metal attrition further contributing to engine wear.

The present invention was developed with a view to providing a means for better control of the factors that govern the combustion process in a diesel engine. However embodiments of the invention may be equally applied to combustion engines running on low grade and/or low octane rated fuels.

SUMMARY OF THE INVENTION

According to the present invention there is provided a split phase fuel conditioner for an internal combustion engine having a main combustion chamber, said split phase fuel conditioner including:

a main body defining an ignition chamber;

a transfer passage having first fluid communication means at one end for controlled fluid communication with said ignition chamber, said transfer passage in fluid communication with said main combustion chamber;

a first valve for selectively opening and closing said first fluid communication means to control fluid communication between said ignition chamber and said main combustion chamber, a first injector for injecting a first fuel volume into said ignition chamber;

a second injector for injecting a second fuel volume into said transfer passage, said second fuel injector coupled to said first valve and operable independently of said first valve; and, ignition means for igniting said first volume while in said ignition chamber to form an ignition plasma;

whereby, in use, after formation of said ignition plasma, said first valve is opened to allow said ignition plasma to flow into said transfer passage to mix with said second fuel/air volume of fuel injected by said second injector, said ignition plasma conditioning said second fuel volume by raising it to above its self-ignition temperature to vaporise said second fuel volume and subsequently flowing through said transfer passage into said main combustion chamber.

Preferably said first valve includes a first valve stem; and, a valve seat disposed at an end of said transfer passage; said valve seat extending from said first fluid communication means, said first valve stem being moveable between a first position where a first end of said first stem is adjacent said seat to substantially impede or shut off fluid communication between said ignition chamber and said transfer passage, said first position corresponding to said first valve being in the closed position; and, a second position where said first end of said first stem is spaced from said seat allowing substantially unimpeded fluid communication between said ignition chamber and said transfer passage, said second position corresponding to first said valve being in said opened position.

Preferably said split phase fuel conditioner includes a solenoid operatively associated with said first valve to control movement of first valve between said opened and closed positions.

Preferably said solenoid includes a moveable member coupled to said first valve stem whereby when said solenoid is energised said moveable member is held by magnetic force generated by said solenoid in a position holding said valve stem in said first position.

Preferably said moveable member is an armature plate.

Preferably said first valve is arranged so that when said first solenoid is de-energised said first valve stem is moveable to said second position to open said first valve by fluid pressure communicated from said main combustion chamber to said first valve stem through said transfer passage.

Preferably said solenoid includes a solenoid housing coupled to said main body, said armature plate being disposed within said solenoid housing, said solenoid housing limiting motion of said armature plate and accordingly said first valve stem in a direction towards said its second position.

Preferably said solenoid housing contains damping means for damping motion of said first valve stem in said direction towards its second position.

Preferably said damping means includes one or more pads of resilient material supported by said solenoid housing.

Preferably said damper alternately, or in addition, includes a spring disposed about an end of said first valve stem distant one end, said spring having one end in abutment with said solenoid housing and an opposite end adapted to engage said armature plate or after said first valve stem travels a first distance from said first position towards said second position.

Preferably said split phase fuel conditioner includes a guide through which said first valve stem extends, said guide sealing one end of said ignition chamber.

Preferably said guide is clamped between said solenoid housing and said one end of said ignition chamber.

Preferably said split phase fuel conditioner includes a bellows seal attached at one end to said guide and at an opposite end about a portion of said valve stem extending beyond said guide.

Preferably said second injector includes a second valve stem extending axially through said first valve stem.

Preferably said second valve stem includes a head adapted to form a seal against said first end of said valve stem, said second valve stem axially moveable relative to said first valve stem to an opened position where said head is spaced from said first end of said first valve stem, whereby fuel injected through said first valve stem by said second fuel injector can flow into said transfer passage.

Preferably said second injector includes a sleeve disposed within said first valve stem and provided with an axial passage through which second valve stem extends, said axial passage and said second valve stem relatively dimensioned to define the fluid flow path therebetween through which said second fuel volume can flow when said second valve stem is in its opened position.

Preferably an inner circumferential surface of said sleeve is formed with one or more helical delivery grooves to assist in imparting a spiral motion to said second fuel volume injected into said transfer passage by said second injector.

Preferably said transfer passage is formed internally of a tube extending from said main body into said main combustion chamber through a housing of said internal combustion engine, said tube provided with a length of an outer diameter such that an air gap is formed between an outer surface of said length of said tube and said housing.

Preferably said tube is provided with one or more jet orifices through which said plasma and conditioned fuel flows to enter said main combustion chamber.

Preferably said transfer passage is of a volume approximately no more than 2% of the clearance volume of said main combustion chamber.

Preferably said transfer is of a volume approximately no more than 1% of said clearance volume.

Preferably said ignition chamber is of a volume no more than 15% of the clearance volume defined of said main combustion chamber.

Preferably said ignition chamber is of a volume between 5% to 10% of said clearance volume.

BRIEF DESCRIPTION OF THE DRAWINGS

An embodiment of the present invention will now be described by way of example only with reference to the accompanying drawings in which.

DETAILED DESCRIPTION OF PREFERRED EMBODIMENT

Figure 1:
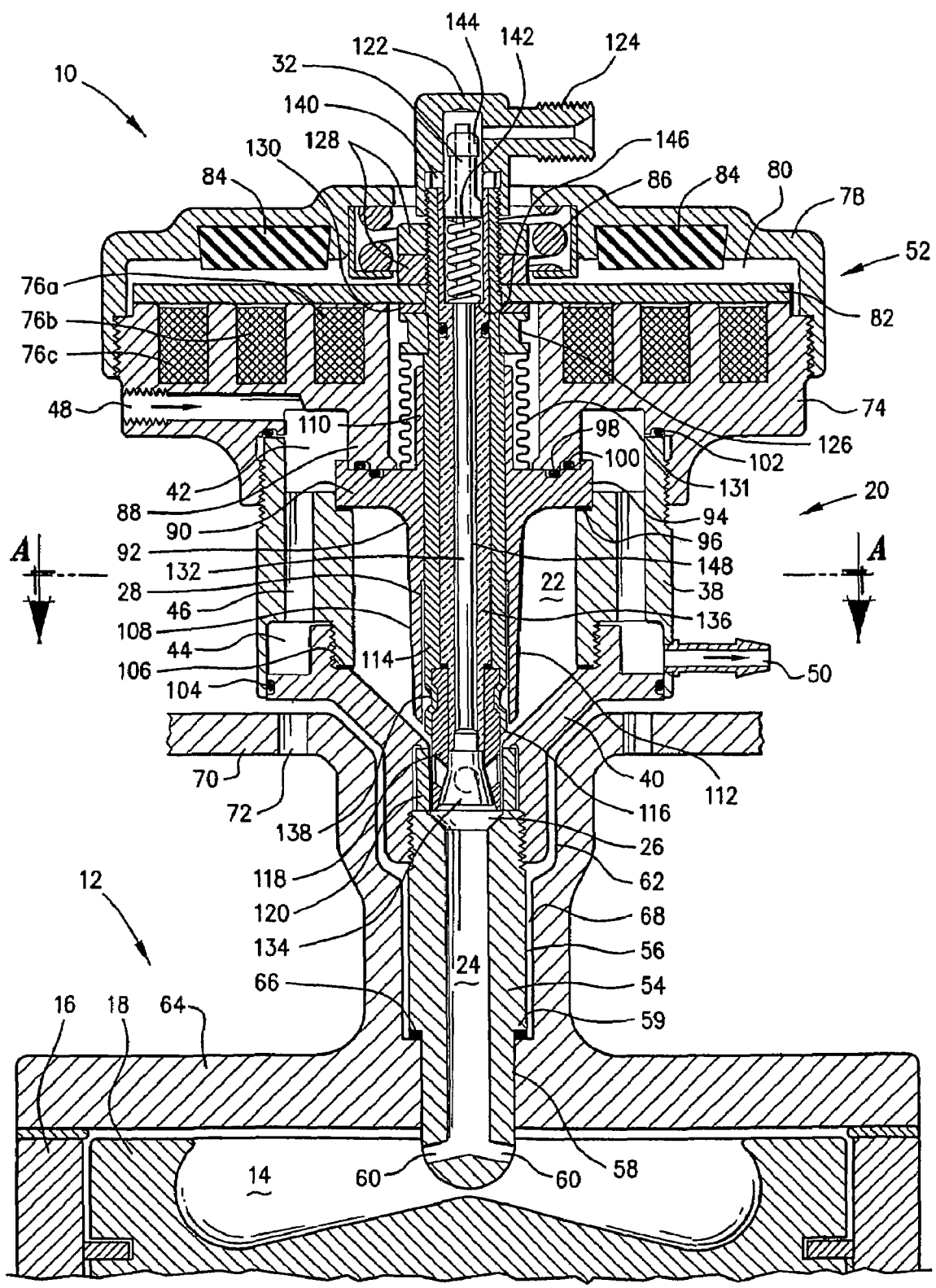
FIG. 1 is a section view of a preferred embodiment of a split phase fuel conditioner in accordance with the present invention.
Figure 2:
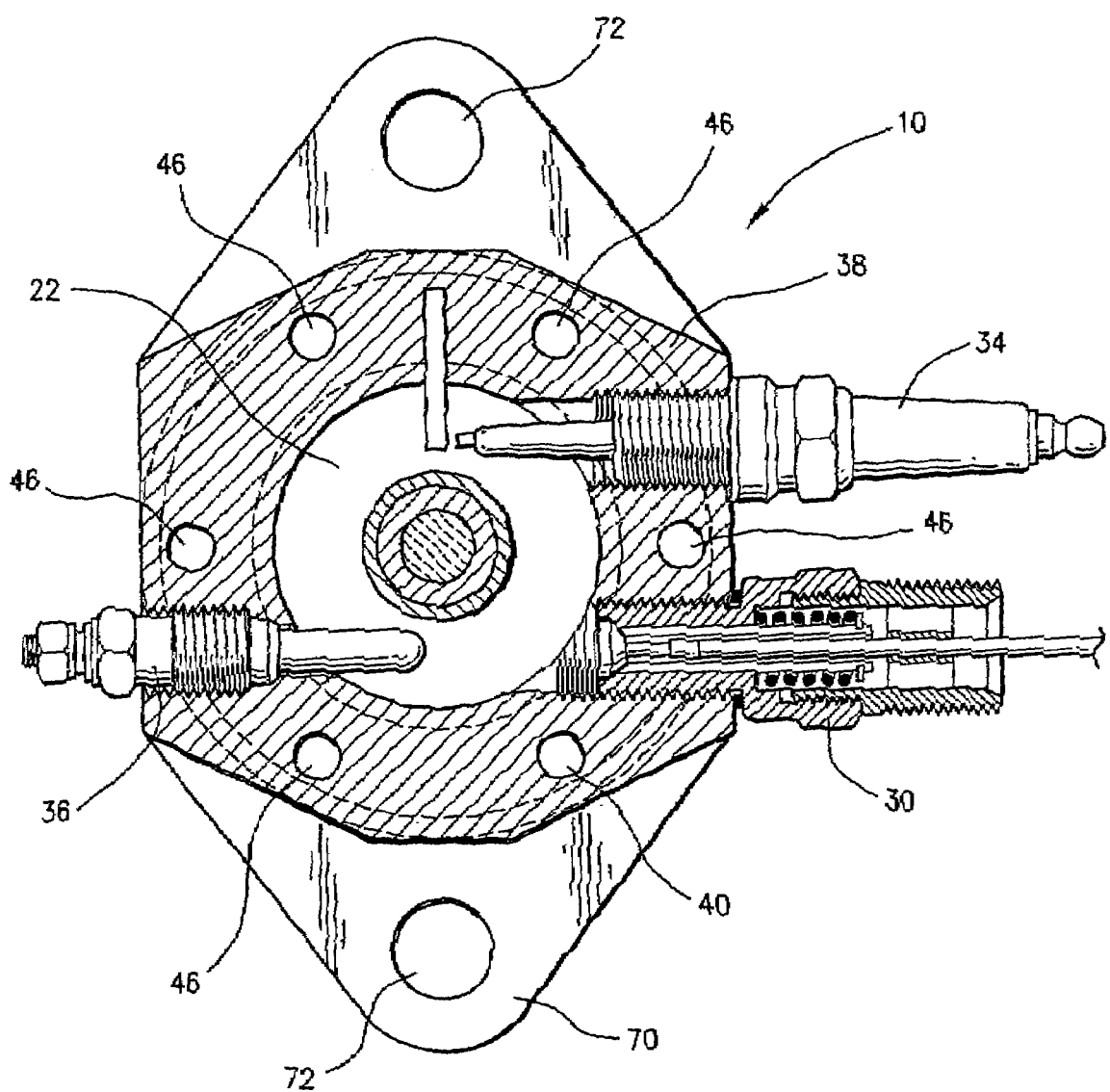
FIG. 2 is a view of section AA taken through FIG. 1.

FIGS. 1 and 2 depict an embodiment of a split phase fuel conditioner 10 for an internal combustion engine 12 having a main combustion chamber 14 defined between an end of a cavity in the form of a cylinder 16 and a piston 18 housed within the cylinder 16. In the present embodiment where the engine 12 is a reciprocating piston engine 12, the engine 12 is likely to include a plurality of combustion chambers defined between respective cylinder ends and pistons. A separate split phase fuel conditioner is provided for each main combustion chamber. For simplicity, the following description is in relation to a single split phase fuel conditioner 10 associated with a single main combustion chamber.

The split phase fuel conditioner 10 includes a main body 20 defining an ignition chamber 22. A transfer passage 24 having first fluid communication means in the form of a throat 26 at one end for controlled fluid communication with the ignition chamber. The transfer passage 24 is also in fluid communication with the main combustion chamber 14. A first valve 28 is provided for selectively opening and closing the throat 26 to control fluid communication between the ignition chamber 22 and the main combustion chamber 14.

As shown in FIG. 2, a first injector 30 is coupled with the main body 20 for injecting a first fuel volume into the ignition chamber 22. A second fuel injector 32 (shown in FIG. 1) injects a second fuel volume into the transfer passage 24. The second injector 32 is coupled to, but operable independently of, the first valve 28. An ignition means in the form of a spark plug 34 is also coupled to the housing 20 and extends into the ignition chamber 22 to provide a spark for igniting fuel injected into the ignition chamber 22. The ignition means may also include a glow plug 36 coupled to the main body 20 and extending into the ignition chamber 22 for heating the fuel/air mixture particularly at initial start-up of the engine 12.

In broad terms, and for the meantime not concerning ourselves with timing issues, the conditioner 10 operates by initially injecting a first fuel volume into the ignition chamber 22 via the injector 30 and igniting this fuel to form an ignition plasma. Thereafter the valve 28 is opened to allow the ignition plasma to flow through the transfer passage 24 into the combustion chamber 14. However, prior to the valve 28 opening, a second fuel volume is injected via the second injector 32 into the transfer passage 24. Thus, the plasma conditions the second fuel volume by raising its temperature above its self-ignition temperature vaporising the second fuel volume then sweeps the conditioned second fuel volume into the combustion chamber 14 where it seeks out oxygen within the main combustion chamber 14 and combusts in a controlled manner, the ignition plasma acting as an ignition source for the second fuel/air mixture. The second fuel volume may vary depending on engine conditions and load in a convention manner.

Looking at the components of the conditioner 10 in more detail, the main body 20 includes an annular body 38 which is screw coupled and sealed at a lower end to a frusto-conical body 40. The main body 20 is provided with an upper circular coolant chamber 42, a lower circular coolant chamber 44 and six vertically extending evenly spaced cooling passages 46 which connect the upper coolant chamber 42 to the lower coolant chamber 44. A coolant inlet 48 leads to the upper coolant chamber 42 while an outlet 50 is provided in fluid communication with the lower coolant chamber 44. As discussed in greater detail below, the upper coolant chamber 42 is defined between an upper end of the annular body 38 and a solenoid housing 52.

The transfer passage 24 is constituted by an axial bore in a tube 54 coupled to an end of the frusto-conical body 40 distant the annular body 38. The tube 54 is provided with a first length 56 with a first outer diameter and a second contiguous length 58 of a smaller outer diameter, with a stepped shoulder 59 formed therebetween. The throat 26 which is at an upper end of the passage 24 progressively widens in a upstream direction. An opposite end of the passage 24 branches to two separate jet orifices 60 formed in the second length 58 of the tube 54 extending into the main combustion chamber 14. The tube 54 extends into a cavity 62 formed in a cylinder head 64 of the engine 12 which normally seats a conventional fuel injector. The shoulder 59 of the tube 54 is sealed with a copper washer 66 to the head 64. It will also be seen that the outer diameter of the length 56 of the tube 54 is smaller than the inner diameter of the portion of the cavity 62 through which it extends to thereby form an air gap 68 therebetween.

The portion of the cylinder head 64 which defines the cavity 62 branches out to form a flange 70 provided with holes 72 to allow attachment of the split phase fuel conditioner 10 by studs (not shown) passing through the hole 72 and attached to the flange 70.

The volume of the passage 24 is ideally no more than 2% of the clearance volume of the engine 12 and more preferably less than 1% of the clearance volume. The clearance volume is the volume of the combustion chamber 14 when the piston 18 is at TDC. Further, the ignition chamber 22 ideally has a volume of no more than 15% of the clearance volume and more preferably a volume of between 5% to 10% of the clearance volume.

The solenoid housing 52 includes a lower portion 74 made from a magnetisable material and provided with a plurality of cutouts for seating concentric electrical coils 76a, 76b and 76c (hereinafter referred to in general as "coils 76"). The coils 76 and lower portion 74 in effect form an electromagnet. Mutually adjacent coils 76 are fed with currents of opposite direction to create reinforcing magnetic fields. The lower portion 74 is threadingly engaged with and sealed to an upper end of the annular body 38 of the main body 20.

The solenoid housing 52 includes an upper portion or cap 78 which is threadingly engaged with the lower portion 74. A space 80 is formed between the cap 78 and the lower portion 76 through which an armature plate 82 can vertically move. Dampers in the form of resilient pads 84 are seated in the cap 78 and extend into the space 80 to dampen the upward motion of the armature plate 82. A further damper in the form of a spring 86 is provided within the solenoid housing 52. One end of the spring 86 abuts the cap 78. An opposite end of the spring 86 is spaced from the armature plate 82 and, as described in greater detail below, adapted to engage the armature plate 82 and/or the valve 28 after they have moved through a first distance.

As is seen most clearly from FIG. 1, the coolant inlet 48 is formed in the lower portion 74 of the solenoid housing 52. Further, the upper coolant chamber 42 is formed between an axially depending boss 88 of the lower portion 74, an upper portion of the annular body 38 and a flange portion 90 of a valve guide 92.

The valve guide 92 is clamped between the main body 20 and the solenoid housing 52. More particularly, the flange 90 is seated about its lower circumferential edge 94 in a seat 96 formed about an inner circumferential surface of the upper end of annular body 38. An upper face of the flange 90 is recessed to receive the boss 88. The upper coolant chamber 42 is sealed by O-rings 98 and 100 disposed between the flange 90 and the boss 88, and an O-ring 102 disposed between the lower portion 74 of the solenoid housing 52 and an upper end of the annular body 38. A further O-ring 104 is provided between the annular body 38 and frusto-conical body 40 to seal one edge of the lower coolant chamber 44. An opposite edge of the lower coolant chamber 44 between the bodies 38 and 40 is sealed with a copper ring 106 which also acts more significantly, to seal the ignition chamber 22.

The valve guide 92 includes a tubular portion 108. The flange 90 extends laterally intermediate of the length of the tubular portion 108 effectively dividing the tubular portion 108 into an upper length 110 of constant inner and outer diameter and a lower length 112 which has a constant inner diameter but a reducing outer diameter in a direction away from the flange 90. It should be appreciated that the flange 90 of the guide 92 effectively seals an upper end of the ignition chamber 22.

The valve 28 includes a hollow tubular valve stem 114 which is able to slide axially of the valve guide 92. A head 116 of the valve stem is provided with a silicon nitride insert which is secured to the valve stem 114 by rolled compression swaging. The lower most end of the insert 118 is tapered inwardly at 45 degrees. The insert 118 forms a substantial seal with a valve sleeve 120 when the valve 28 is closed to substantially impede or shut-off fluid. The sleeve 120 is also formed of a silicon nitride material and is disposed at an end of the transfer passage 24 adjacent the throat 26. The insert 118 and sleeve 120 are arranged so that they do not actually impact against each other when the valve 28 is closed.

An upper end of the stem 114 extends beyond the upper length 110 of the valve guide 92 axially through the armature plate 82 and into a connection elbow 122 which extends through the cap 78 of the solenoid housing 52. The connection elbow 122 includes an integrated coupled 124 for coupling to a fuel hose or rail (not shown) for delivery of fuel to the second injector 32.

The stern 114 is secured to the armature plate 82 by a shrink fit collar 126 and locking nuts 128. The collar 126 is fitted about a portion of the stem 144 which extends beyond the upper length 110 of the guide 92 but below the armature plate 82. A sealing disc 130 is disposed between the collar 126 and the armature plate 82. The locking nuts 128 are screwed onto an outer circumferential thread formed about a portion of the stem 114 extending beyond the armature plate 82.

An electroformed laminated nickel sealing bellows 131 forms a seal about a portion of the stem 114 that extends beyond the upper length 110 of the guide 92. One end of the bellows 131 is sealed against the flange 90 of the guide 92 while an opposite end is sealed against the collar 126. The bellows 131 acts as a centralising spring which, when forces or pressures are low, maintains the valve 28 opened.

The second injector 32 includes a valve stem 132 that extends axially through the stem 114. Valve stem 132 is provided with a valve head 134 at a lower end which, when no fluid pressure acts on the valve 32, seals against the insert 118. Further, when the valve 28 is closed, the valve head 134 also seals against an inside of the seat 120. The stem 132 is axially slidable within a sleeve 136 which is disposed within and effectively coupled to the stem 114. A lower portion 138 of the sleeve 136 is formed with a reduced outer diameter and extends into the insert 118. An upper end 140 of the sleeve 136 is flared outwardly over an upper end of the stem 114 and received within the elbow 122. A closing spring 142 is disposed about the stem 132 acting between a stop 144 attached to an upper end of the stem 132 and a shoulder 146 formed internally of the sleeve by reaming an axial passage 148 of the sleeve 136 through which the valve stem 132 extends.

The passage 148 and valve stem 132 are relatively dimensioned so that a gap forms therebetween creating a flow passage through which fuel can flow into the transfer passage 24 when the valve 32 is opened. The inside surface of the sleeve 136, particularly of its lower portion 138 can be provided with a spiral groove to assist in imparting spiral motion to the fuel injected by the injector 32.

When the coils 76 are energised, the armature plate 82 is held by magnetic force onto an upper surface of the lower portion 74 of the armature housing 52. This places the valve stem 114, and in particular the insert 118, in a first position where it is adjacent, and moreover received in, the valve sleeve 120 to substantially impede or shut-off fluid communication between the ignition chamber 22 and the transfer passage 24. This is equivalent to the valve 28 being closed. However, when the coils 76 are de-energised, the valve stem 114 is free to slide axially in an upward direction to a second position where the insert 118 is spaced from the sleeve 120 thereby allowing substantially unimpeded fluid communication between the ignition chamber 22 and the transfer passage 24. This is equivalent to the valve 28 being opened. This upward movement is caused by fluid pressure within the main combustion chamber 14 being communicated via the passage 24 to the valve 28 via the valve head 134 and insert 118. The resilient pads 84 and spring 86 act to dampen impact of the armature plate 82 against the cap 78 when the valve 28 is opened.

It is envisaged that soft closure techniques may be employed for closing the valve 28. This involves applying a low voltage initially to the coils 76 to gently close the valve 28 during the early phases of the cycle of the engine 10 and then at about 90° before top dead center (BTDC) applying full voltage to the coil 76 to firmly hold the valve 28 in the closed position against rising compression pressure.

The operation of the split phase fuel conditioner 10 will now be described in detail. Some time after completion of the previous power stroke, and with the valve 28 closed by the application of electrical current to the coils 76, the injector 30 injects a first fuel volume, mixed with air into the ignition chamber 22. Typically, the fuel/air mixture will be on the rich side. It is envisaged that the air provided to the injector 30 will be from an engine driven compressor at a pressure regulated to a desired compression ratio, typically the same as the compression ratio of the engine 12, namely about 12:1 or, leaving aside the effects of heat, about 176 psi. The air is provided to an air receiver (not shown) from the compressor for subsequent communication with the injector 30.

An alternate to the use of a compressor, and practical with a multi-cylinder engine, would be the use of one of the engine's cylinders for this compression by replacing an injector of that cylinder with a suitably designed one-way valve and pipe work to an air receiver in communication with the injector 30. Then, at attainment of a suitable pressure surplus, pneumatically holding the engine's inlet valve partially opened to prevent further compression. When the air receiver pressure approaches the desired ignition chamber pressure, the inlet valve of the cylinder could then be fully closed to resume compression. This reduces undue work while engine balance is maintained.

The injector 30 injects the first fuel volume mixed with or entrained in air tangential to the chamber 22 thereby resulting in a circular flow of said fuel and air about the chamber 22. This fuel/air mixture is heated by the glow plug 36 to cause vaporisation, however it is unable to spontaneously combust as there is insufficient compression heat within the chamber 22. Rather, ignition of the fuel/air mixture within the chamber 22 is controlled by the timing of spark plug 34. It therefore also follows that ignition within the ignition chamber 22 is not in any way controlled by the timing of the piston 16. Thus, injection of the fuel/air mixture via the injector 30 into the ignition chamber 22 is arranged at any suitable time to allow a sufficient period for preparation and conditioning of the fuel/air mixture to be in ideal condition for spark ignition by the spark plug 34 just prior to TDC.

It is anticipated that the rotational turbulence caused by the injection of the fuel/air mixture into the ignition chamber 22 will cause the fuel/air mixture to rotate several times past the glow plug 36 and assist in vaporising the fuel particularly at cold start-up. Pre-ignition within the ignition chamber 22 is voided or at least can be controlled by maintaining the compression ratio within the chamber at about 12:1 and reducing residence time. Further, as air is applied to the injector 30 via an air receiver, compression heat is not available to cause premature ignition.

Compression within the main combustion chamber 14 is achieved by movement of the piston 18 in the conventional manner. Compression resulting from the piston 18 results in compression of only air within the main combustion chamber 14. This has an advantage in terms of emission control as fuel cannot be forced into remote areas and thus fail to combust.

At a desired moment, generally just prior to maximum compression being reached in the main combustion chamber 14, the spark plug 34 is operated to initiate combustion of the fuel/air mixture within the ignition chamber 22. If the valve 28 is not opened within about 15 crank degrees the combustion pressure within the ignition chamber 22 rises very rapidly to near its maximum pressure. As a result of the small size and volume of the chamber 22, and the rotational turbulence, flame propagation within the chamber 22 is relatively fast.

It is known that for about the first five crank degrees after sparking, there is little if any measurable pressure rise. Thereafter, pressure rise is expediential. As both the valve 28 and spark plug 34 are electronically controlled, the timing of the spark and opening of the valve 28 can be controlled with great accuracy. An engine control unit (ECU—not shown) can be programmed with advanced curves to automatically adjust these functions to optimum levels with changes of engine speed and load. The ignition plasma arising from the combustion of the fuel/air mixture within the ignition chamber 22 is able to be discharged through the valve 28 at a very high velocity. The velocity is by and large controlled by spark timing. As intimated above, it the ignition plasma is released before 5 crank degrees after delivery of the spark from the spark plug 34, its discharge velocity will be relatively low. However, if discharged at say 10 to 15 crank degrees thereafter, the pressure within the ignition chamber 22 will be substantially higher than that in the main combustion chamber 14 and thus the velocity of the plasma discharge will be very high.

The injector 32 delivers the second fuel volume directly into the transfer passage 24 at the conventional diesel injection time of 17-15° (BTDC) with completion before TDC, or if needed for additional heat exchange, injection of fuel through the second injector 32 can be arranged to commence slightly before the abovementioned times. The grooves on the inside wall of the sleeve 136 assist in imparting a spiral motion to the fuel injected via the second injector 32. This assists in ensuring impingement of the fuel onto the walls of the tube 54 defining the passage 24. This fuel is largely vaporised by heat transfer from the tube 54. The air gap 68 enhances the transfer by insulating to isolate the length 56 of the tube 54 from the normal cooling system of the engine 12.

Just after TDC the valve 28 is rapidly opened by shutting off current to the coils 76 allowing the valve 28 and in particular the valve stem 114 to move vertically upward against the compression pressure within the main combustion 14 being communicated via the transfer passage 24. Thus, with the insert 118 now spaced from the sleeve 120 the ignition plasma from the ignition chamber 22 which is at a considerably higher pressure than the compression pressure within the main combustion chamber 14 is able to very rapidly flow through the throat 26 into the transfer passage 24 where it sweeps and collects the vaporised fuel/air mixture, with the mixture of the ignition plasma and vaporised fuel subsequently flowing through the jet air orifices 60 into the main combustion chamber 14. As the volume of the passage 24 is very small, even at idle fuel volumes, the mixture strength and lack of oxygen will prevent any effective combustion from occurring within the passage 24. However, the mixture of ignition plasma and fuel vapours will burn as it leaves through the jet nozzles 60 in direct proportion to its ability to combine with the abundant oxygen in the compression heated air of the main combustion chamber 14. In effect the second fuel volume injected into the transfer passage is raised in temperature well above the fuels self-ignition temperature and converted into a gaseous state that has ideal characteristics to mix and combust in the oxygen rich main combustion chamber.

The combustion process within the main combustion chamber 14 is effected by the kinetic and thermal energy of the ignition plasma and fuel vapour emanating from the gas jets 60. This in turn is dependent on the velocity of discharge. As previously explained, the velocity is controllable by the timing of the spark emanated by plug 34. Consequently, this provides a convenient method to ensure very rapid but controlled combustion of the main fuel volume in a consistent manner, regardless of the fuel's normal ignition qualities, and at a time when the main combustion chamber 14 starts to expand in a sympathetic manner. Moreover, the pressure of the ignition plasma discharge and size of jet orifices 60 can be arranged to ensure its discharge through the jet orifices 60 at sonic velocity to facilitate sonic plasma enhanced combustion.

Such action is not practical in a conventional diesel engine due to its dependence upon compression heat to instigate combustion which, for practical time and heat reasons must establish combustion before TDC at the same time the compression pressure is also approaching its maximum so compounding the resultant pressure rise. Diesel and spark ignition engines are forced to start combustion well before TDC in order to optimise their performance, consequently, there is no empirical data available on or shortly after TDC, but consideration of such appears to afford considerable emission and operational advantages.

From the above description, it will be apparent that the total volume of fuel injected during a cycle of the engine is split by the conditioner 10 between the first volume injected by the injector 30 into the ignition chamber 22 and a second volume injected by the injector 32 directly into the transfer passage 24, thus giving rise to "split phase" combustion. It will be further apparent that the volume of fuel injected by injector 30 into the ignition chamber 22 starts combustion before TDC in independence of the engine timing and position of piston 16. Such independence of timing is clearly not available with conventional diesel cycle engines.

While the above embodiment has been described largely in relation to diesel engines, the conditioner 10 is well suited for operation with low grade and/or low octane fuels as it allows a portion of the fuel required for each cycle to be conditioned and combusted prior to TDC, while also substantially vaporising the main volume of fuel which may then be mixed with the ignition plasma which ignites the main volume of fuel.

Figure 3:
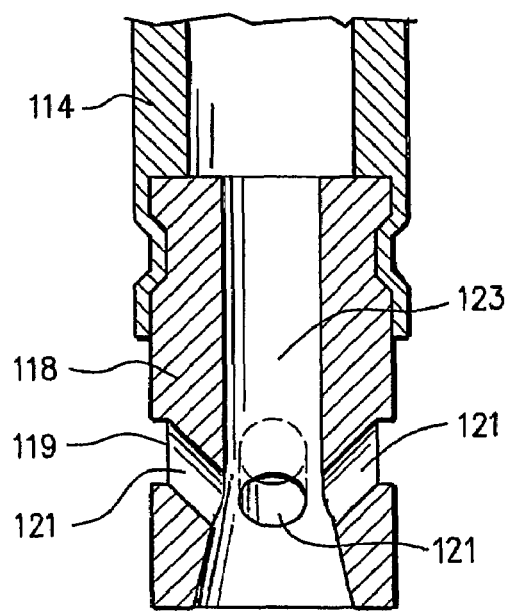
FIG. 3 is an exploded section view of an alternate embodiment of a valve incorporated in the split phase fuel conditioner depicted in FIG. 1; and, FIG. 4 is a view of the embodiment of the valve depicted in FIG. 3 in a closed position.
Figure 3:
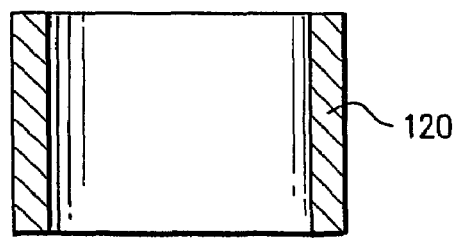
Figure 4:
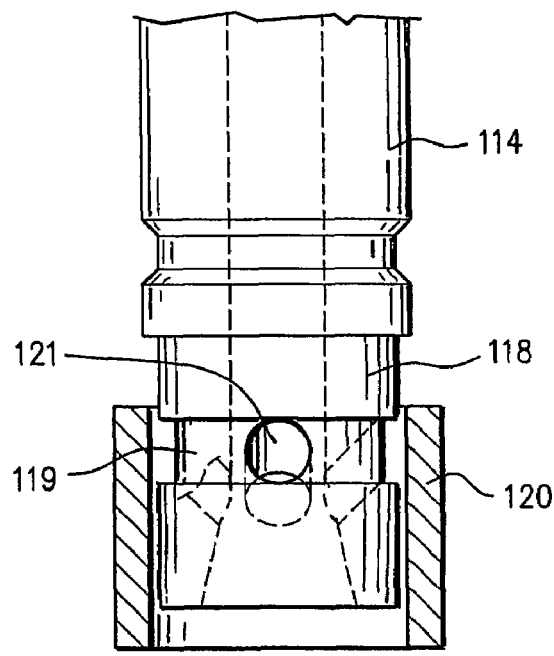

Now that an embodiment of the present invention has been described in detail it will be apparent to those skilled in the relevant arts that numerous modifications and variations may be made without departing from the basic inventive concepts. For example, while there are operational advantages in solenoid control of the valve 24 if desired, valve 24 may be operated mechanically. It would be appreciated that in this event electronic timing still allows precision control of the fuel injector 30 and spark plug 34 to facilitate ignition of a first volume of fuel/air mixture. Also, while the present embodiment is described in relation to a reciprocating piston engine it may also be applied to a rotary engine (such as the Wankel engine). In such an embodiment the main combustion chamber is defined by a cavity formed in the housing of the engine and the rotor of the engine. The transfer tube 54 would pass through a passage in the housing. In addition, the insert 118 and sleeve 120 of the valve 28 may be formed with alternate configurations to that depicted in FIG. 1. In particular, referring to FIGS. 3 and 4, an alternately configured insert 118' and valve sleeve 120' are depicted. In this embodiment, the insert 118' is provided with an intermediate band 119 of reduced outer diameter and through which is formed a plurality of downwardly inclined holes 121 which extend from the outer surface of the intermediate band 119 to an axial passage 123 of the insert 118'. The axial passage 123 has an upper length of substantially constant inner diameter and a lower length of progressively increasing inner diameter so that the lower portion of the passage 123 is of a shape substantially complimentary to that of the valve head 134. Thus in this embodiment the valve head 134 can form a substantial seal with the inside surface of the passage 123 of the insert 118'. The valve sleeve 120' in this embodiment is in the form of a short cylindrical tube of constant inner diameter. As the valve 28 opens and closes, the insert 118' reciprocates within the sleeve 120' between an open position where the intermediate band 119 is at least partially disposed above and outside of the sleeve 120' allowing fluid communication between the ignition chamber 22 and the transfer passage 24 via the holes 119 and passageway 123; and a closed position where the intermediate band 119 is wholly disposed within the sleeve 120' (as depicted in FIG. 4) substantially impeding fluid flow between the ignition chamber 22 and transfer passage 24. The substantial impedance being provided by forming the outer diameter of at least an upper part of the insert 118' extending from the stem 114 to be only marginally smaller than the inner diameter of the sleeve 120'.

All such modifications and variations as would be apparent to those of ordinary skill in the relevant arts are deemed to be within the scope of the present invention the nature of which is to be determined from the above description and the appended claims.

The invention claimed is:

1. A split phase fuel conditioner for an internal combustion engine having a main combustion chamber, said split phase fuel conditioner comprising:
a main body defining an ignition chamber;
a transfer passage having a throat at one end for controlled fluid communication with said ignition chamber, said transfer passage in fluid communication with said main combustion chamber;
a first valve for selectively opening and closing said throat to control fluid communication between said ignition chamber and said main combustion chamber;
a first injector for injecting a first fuel volume into said ignition chamber;
a second injector for injecting a second fuel volume into said transfer passage through the first valve, said second fuel injector coupled to said first valve and operable independently of said first valve, the transfer passage being upstream of the main combustion chamber relative to a direction of flow of the second volume of fuel when injected by the second injector; and
an igniter to ignite said first fuel volume while in said ignition chamber to form an ignition plasma;
wherein after formation of said ignition plasma, said first valve is opened.

2. The conditioner according to claim 1, wherein said first valve comprises a first valve stem; and, a valve seat disposed at an end of said transfer passage; said valve seat extending from said throat, said first valve stem being moveable between a first position where a first end of said first stem is adjacent said seat to substantially impede or shut off fluid communication between said ignition chamber and said transfer passage, said first position corresponding to said first valve being in the closed position; and, a second position where said first end of said first stem is spaced from said seat allowing substantially unimpeded fluid communication between said ignition chamber and said transfer passage, said second position corresponding to first said valve being in said opened position.

3. The conditioner according to claim 2, further comprising a guide through which said first valve stem extends, said guide sealing one end of said ignition chamber.

4. The condition according to claim 3, further comprising a bellows seal attached at one end to said guide and at an opposite end about a portion of said valve stem extending beyond said guide.

5. The conditioner according to claim 4 wherein said second injector includes a second valve stem extending axially through said first valve stem.

6. The conditioner according to claim 5, wherein said second valve stem includes a head adapted to form a seal against a first end of said valve stem, said second valve stem axially moveable relative to said first valve stem to an opened position where said head is spaced from said first one of said first valve stem, whereby fuel injected through said first valve stem by said second fuel injector can flow into said transfer passage.

7. The conditioner according to claim 6, wherein said second injector includes a sleeve disposed within said first valve stem and provided with an axial passage through which second valve stem extends, said axial passage and said second valve stem relatively dimensioned to define the fluid flow path therebetween through which said second fuel volume can flow when said second valve stem is in its opened position.

8. The conditioner according to claim 7, wherein an inner circumferential surface of said sleeve is formed with one or more helical delivery grooves to assist in imparting a spiral motion to said second fuel volume injected into said transfer passage by said second injector.

9. The conditioner according to claim 1, wherein said transfer passage is formed internally of a tube extending from said main body into said main combustion chamber through a housing of said internal combustion engine, said tube provided with a length of an outer diameter such that an air gap is formed between an outer surface of said length of said tube and said housing.

10. The conditioner according to claim 9, wherein said tube is provided with one or more jet orifices through which said plasma and conditioned fuel flows to enter said main combustion chamber.

11. The conditioner according to claim 1, wherein said transfer passage is of a volume approximately no more than 2% of a clearance volume of said main combustion chamber.

12. The conditioner according to claim 11, wherein said transfer passage is of a volume approximately no more than 1% of said clearance volume.

13. The conditioner according to claim 1, wherein said ignition chamber is of a volume no more than 15% of the clearance volume of said main combustion chamber.

14. The conditioner according to claim 1, wherein said ignition chamber is of a volume between 5% to 10% of said clearance volume.

15. The conditioner according to claim 1 further comprising a solenoid operatively associated with said first valve to control movement of first valve between said opened and closed positions.

16. The conditioner according to claim 15, wherein said solenoid includes a moveable member coupled to said first valve stem whereby when said solenoid is energized said moveable member is held by magnetic force generated by said solenoid in a position holding said valve stem in said first position.

17. The conditioner according to claim 16, wherein said first valve is arranged so that when said solenoid is de-energized said first valve stem is moveable to said second position to open said first valve by fluid pressure communicated from said main combustion chamber to said first valve stem through said transfer passage.

18. The conditioner according to claim 17, wherein said solenoid includes a solenoid housing coupled to said main body, said moveable member is disposed within said solenoid housing, said solenoid housing limiting motion of said moveable member and accordingly said first valve stem in a direction towards said second position.

19. The conditioner according to claim 18, wherein said solenoid housing contains damper for damping motion of said first valve stem in said direction towards its second position.

20. The conditioner according to claim 19, wherein said damper includes one or more pads of resilient material supported by said solenoid housing.

21. The conditioner according to claim 20, wherein said damper alternately, or in addition, includes a spring disposed about an end of said first valve stem distant one end, said spring having one end in abutment with said solenoid housing and an opposite end adapted to engage said armature plate or after said first valve stem travels a first distance from said first position towards said second position.

22. A method of making a split phase fuel conditioner for an internal combustion engine having a main combustion chamber, comprising:
provciding a main body defining an ignition chamber;
providing a transfer passage having a throat at one end for controlled fluid communication with said ignition chamber, said transfer passage in fluid communication with said main combustion chamber;
providing a first valve for selectively opening and closing said throat to control fluid communication between said ignition chamber and said main combustion chamber;
providing a first injector for injecting a first fuel volume into said ignition chamber;
providing a second injector for injecting a second fuel volume into said transfer passage through the first valve said second fuel injector coupled to said first valve and operable independently of said first valve, the transfer passage being upstream of the main combustion chamber relative to a direction of flow of the second volume of fuel when injected by the second injector; and,
providing an igniter to ignite said first fuel volume while in said ignition chamber to form an ignition plasma;
wherein after formation of said ignition plasma, said first valve is opened.

23. A method of using a split phase fuel conditioner for an internal combustion engine having a main combustion chamber, the method comprising:
providing a main body defining an ignition chamber;
providing a transfer passage having first fluid communication means at one end for controlled fluid communication with said ignition chamber, said transfer passage in fluid communication with said main combustion chamber;
providing a first valve for selectively opening and closing said first fluid communication means to control fluid communication between said ignition chamber and said main combustion chamber;
providing a first injector for injecting a first fuel volume into said ignition chamber;
providing a second injector for injecting a second fuel volume into said transfer passage through the first valve, said second fuel injector coupled to said first valve and operable independently of said first valve, the transfer passage being upstream of the main combustion chamber relative to a direction of flow of the second volume of fuel when injected by the second injector,
providing an igniter to ignite said first fuel volume while in said ignition chamber to form an ignition plasma; and
after forming said ignition plasma, opening said first valve.

* * * * *